May 2, 1967
W. JUDA
3,317,292
METHOD OF TREATING WASTE SUBSTANCES TO DERIVE
HYDROGEN AND OTHER GASES THEREFROM, AND
HYDROGEN-CONTAINING GASEOUS PRODUCT
Filed Nov. 15, 1962
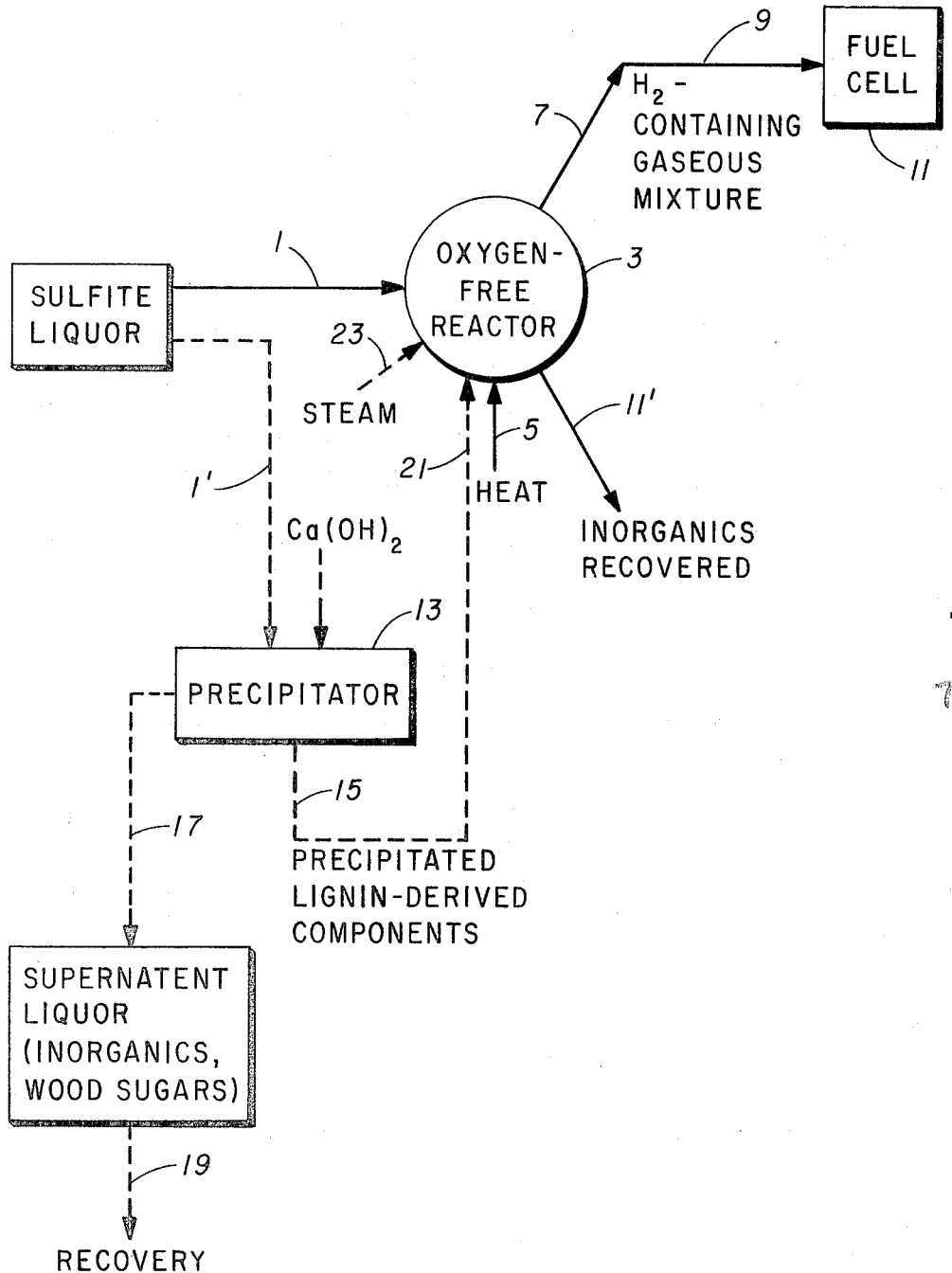
WALTER JUDA, INVENTOR.
BY Rines and Rines
ATTORNEYS

United States Patent Office 3,317,292
Patented May 2, 1967

3,317,292
METHOD OF TREATING WASTE SUBSTANCES TO DERIVE HYDROGEN AND OTHER GASES THEREFROM, AND HYDROGEN-CONTAINING GASEOUS PRODUCT
Walter Juda, Lexington, Mass., assignor to Prototech Incorporated, Cambridge, Mass., a corporation of Massachusetts
Filed Nov. 15, 1962, Ser. No. 237,898
3 Claims. (Cl. 48—209)

The present invention relates to methods of deriving hydrogen and other gases from waste substances, and, more particularly, to methods of treating inorganic and lignin-derived organic components contained in waste substances such as sulfite waste liquor, kraft "black" liquor and the like, and to novel gaseous mixtures comprising hydrogen resulting therefrom.

In the manufacture of paper from wood chips and the like, approximately one-half of the wood product is converted into pulp for paper production and the other half is currently wasted. In this sulfite process, the wood chips are digested, for example, with an aqueous calcium sulfite liquor, thereby forming calcium lignin sulfonate waste product in solution, leaving wood pulp behind. This waste solution is usually discharged into streams and constitutes a pollultion problem. Another process is the so-called kraft or sulfide process in which the wood chips are digested with a liquor containing sodium carbonate and sodium sulfide. The resulting so-called "black" liquor contains the lignin component of the wood and the inorganics (including sodium carbonate and sodium sulfide) in solution. It is common to recover the inorganic chemicals by evaporating the black liquor, recovering the inorganics and burning the organic component of the black liquor in air. In this process, use is made of the organics for their heat value only.

Efforts have been made to produce chemicals from these and other wood wastes. While specialty chemicals have been made and sold, the tonnage of lignin-containing wastes produced annually is much too large for the potential chemical market. Thus, at present, the waste constitutes a disposal problem or is used as an inefficient source of heat, with only a minor portion of the waste useful as a raw material for chemicals.

The present invention is primarily concerned with a new and improved method of treating such waste substances containing inorganic and lignin-derived organic components than can produce, in a relatively efficient manner, a gaseous mixture that is suitable, preferably, for utilization as a fuel as, for example, for production of electricity in fuel cells or in other processes.

A further object of the present invention is to provide a novel gas mixture comprising hydrogen that may be evolved from the above-described method and that is particularly suitable as a fuel, for such purposes as generating electricity from fuel cells and the like.

Other and further objects of the invention will be hereinafter pointed out and will be more particularly delineated in the appended claims.

The invention will now be described in connection with the accompanying drawing, the single figure of which is a flow diagram of a preferred embodiment of the invention.

For purposes of illustration, the flow sheet of the figure has been prepared with specific reference to sulfite liquor waste containing inorganic and lignin-derived organic components and water, although it is to be understood that similar waste substances may be treated in a similar manner to attain the novel results of the invention. The sulfite liquor is shown fed at 1 into a reaction chamber 3 which, in accordance with an important feature of the invention, must be maintained substantially free of an oxygen-containng atmosphere. Steam at temperatures at least of the order of several hundred degrees centigrade must be produced within the reaction chamber 3, as by heat applied at 5.

Under such circumstances, in view of the lack or oxygen in the atmosphere of the reaction chamber 3, a gaseous mixture comprising hydrogen, an oxide of carbon (often carbon monoxide) and/or gaseous decomposition products of at least partially pyrolized and/or carbonized lignin is produced and may be removed at 7. As in the conventional water-gas reaction involving carbon (later discussed), at temperatures of the order of 1000° centigrade, carbon monoxide will principally result; whereas, at lower temperatures of the order of several hundred degrees centigrade, a carbon dioxide-rich mixture is obtained.

In accordance with the present invention, this gaseous hydrogen mixture output at 7 may be directly used as a fuel by, for example, feeding the same, as at 9, to a fuel cell 11 or other gaseous fuel-consuming or electrochemical consuming device for producing electricity. Inorganics, such as some sulfides or carbonates, may be recovered, if desired, at the output 11'.

As an alternative procedure, the water-containing sulfite liquor may be fed along the alternate route 1' to a precipitator 13 into which calcium hydroxide, for example, is fed, thereby to precipitate at 15 lignin-derived components from the sulfite liquor. The supernatant liquor may be removed along path 17, containing some inorganics, wood sugars and the like, which may be separated at 19 for recovery, if desired. The precipitated lignin-derived components at 15 may then be applied along path 21 to the reaction chamber 3 into which steam of the necessary before-described temperature may be fed from a source 23.

Similar stoichiometric considerations to those involved in the before-mentioned water-gas reactions (as described for example, on pages 108–109 of The Chemical Process Industry, R. N. Shreve, McGraw-Hill, 1945) may apply to the application of steam from the source 23 and the lignin-derived components applied from 15.

Included in the lignin-derived organic components may be lignin sulfonic acid, lignin sulfonates, alkali lignins, acid lignins, and lignin derivatives, resulting from the reaction of lignin-containing materials with alkali carbonate and sulfide. Included in the gaseous mixture at 7 may be carbon monoxide and/or carbon dioxide, gaseous decomposition products of pyrolyzed lignin, and gaseous sulfur compounds including hydrogen sulfide.

Preferred temperatures for providing at least partial pyrolizing and carbonizing of the lignin-derived organic components in the steam reaction in chamber 3 have been determined to be from about 550° to 1000° centigrade.

Further modifications will occur to those skilled in the art and are considered to fall within the spirit and scope of the invention as defined in the appended claims.

What is claimed is:

1. A method of treating waste-substance liquor containing inorganic components and lignin-derived organic solute components, that comprises precipitating lignin-derived components from said liquor, separating the precipitate from the supernatant liquor, reacting the precipitate with steam at temperatures at least of the order of several hundred degrees centigrade, and in stoichiometric proportions to favor production of carbon monoxide and hydrogen, in a reaction atmosphere substantially void of free oxygen, in order to produce carbon monoxide and hydrogen gases, and withdrawing a hydrogen-containing gaseous mixture.

2. A method as claimed in claim 1 and in which the reaction is effected at temperatures of from about 550° to 1000° centigrade.

3. A method as claimed in claim 1 and in which the lignin-derived organic components are selected from the group consisting of lignin sulfonic acid, lignin sulfonates, alkali lignins, acid lignins, and lignin derivatives resulting from the reaction of lignin-containing materials with alkali carbonate and sulfide.

References Cited by the Examiner

UNITED STATES PATENTS

| Re. 15,320 | 3/1922 | McDonald | 48—209 |
| 1,499,363 | 7/1924 | Goodell | 23—46 X |
| 1,560,649 | 11/1925 | Beveridge | 23—46 |
| 1,581,441 | 4/1926 | Harris | 48—197 |
| 3,083,077 | 3/1963 | Bjorkman et al. | 23—48 |
| 3,103,474 | 9/1963 | Juda. | |

MORRIS O. WOLK, *Primary Examiner.*

DELBERT E. GANTZ, *Examiner.*

R. M. REESE, *Assistant Examiner.*